United States Patent
Fauteux et al.

[11] Patent Number: 5,853,917
[45] Date of Patent: Dec. 29, 1998

[54] ELECTROLYTIC CELL HAVING A CONTROLLED ELECTRODE SURFACE INTERFACE

[75] Inventors: Denis G. Fauteux, Acton; Jie Shi, Arlington, both of Mass.

[73] Assignee: Mitsubishi Chemical Corporation, Japan

[21] Appl. No.: 812,021

[22] Filed: Mar. 6, 1997

[51] Int. Cl.$^6$ ................................................. H01M 6/14
[52] U.S. Cl. .......................... 429/194; 429/197; 429/218
[58] Field of Search .................................. 429/218, 194, 429/197

[56] References Cited

U.S. PATENT DOCUMENTS 5,529,859  6/1996  Shu et al. ............................... 429/194
5,626,981  5/1997  Simon et al. ........................... 429/197

FOREIGN PATENT DOCUMENTS 7-220756  8/1995  Japan .
8-273700  10/1996  Japan .

*Primary Examiner*—Bruce F. Bell
*Attorney, Agent, or Firm*—Factor and Shaftal

[57] ABSTRACT

The present invention is directed to an electrolytic cell having a controlled electrode surface interface, and, an associated manufacturing and chemical process. The electrolytic cell includes an electrode with a carbon surface, and, an electrolyte having a solvent. An additive, associated with at least one of the electrolyte or first and second electrodes, reacts with the carbon surface to form a passivating layer so as to block chemical interaction between the carbon surface and the solvent. Furthermore, the additive will not result in gas formation upon its decomposition.

15 Claims, 6 Drawing Sheets

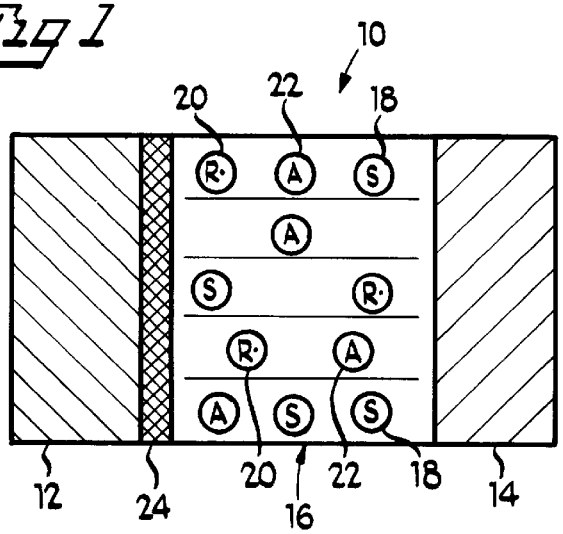
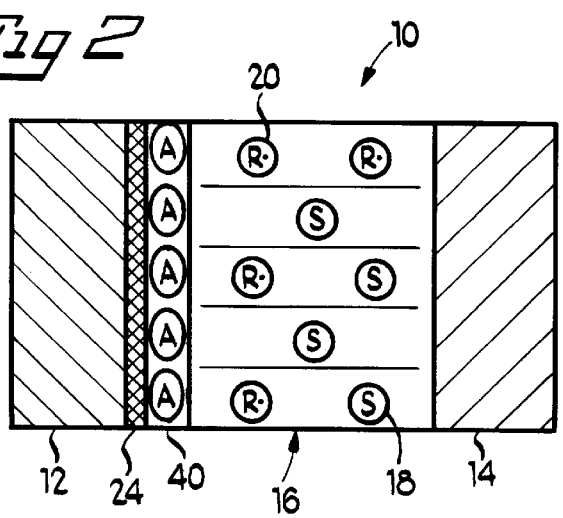
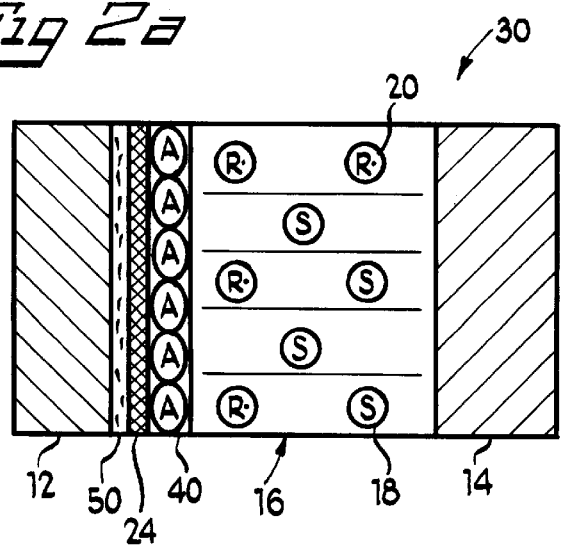
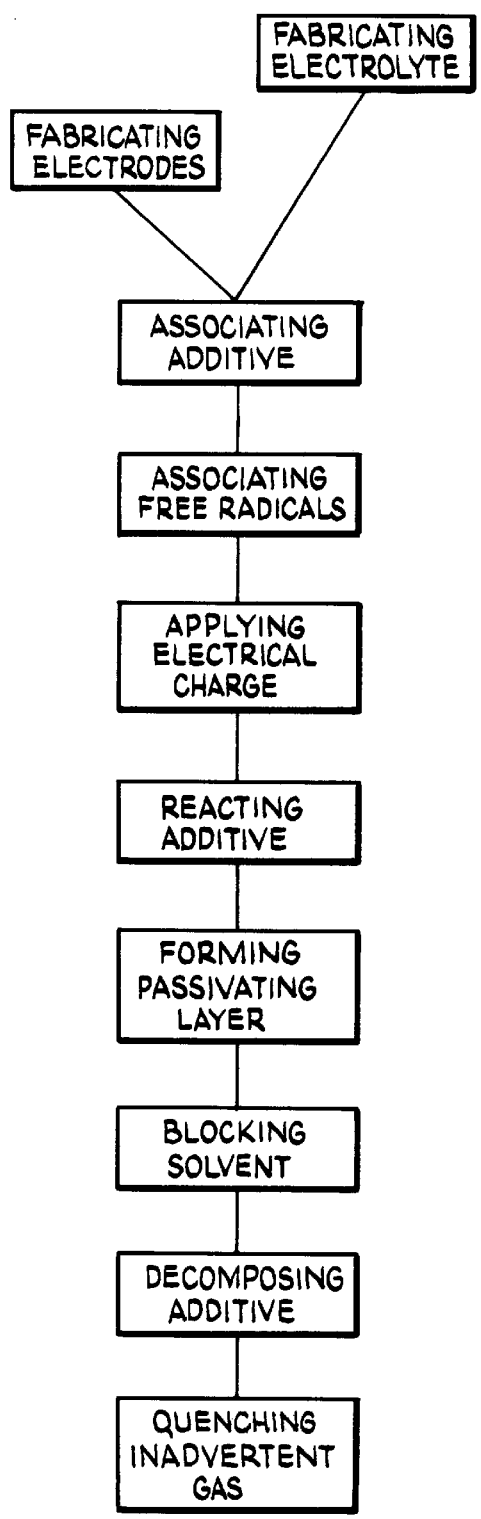

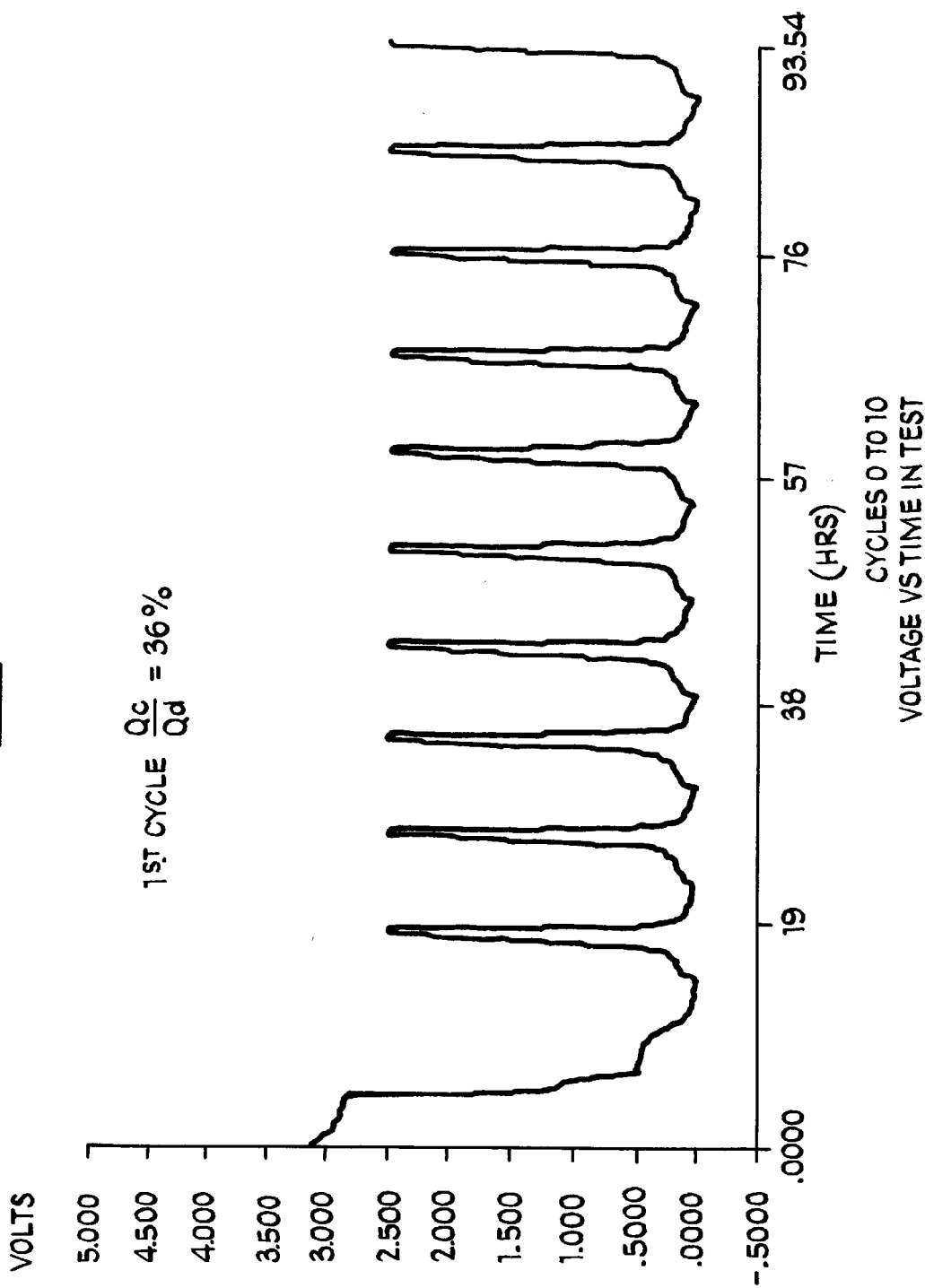

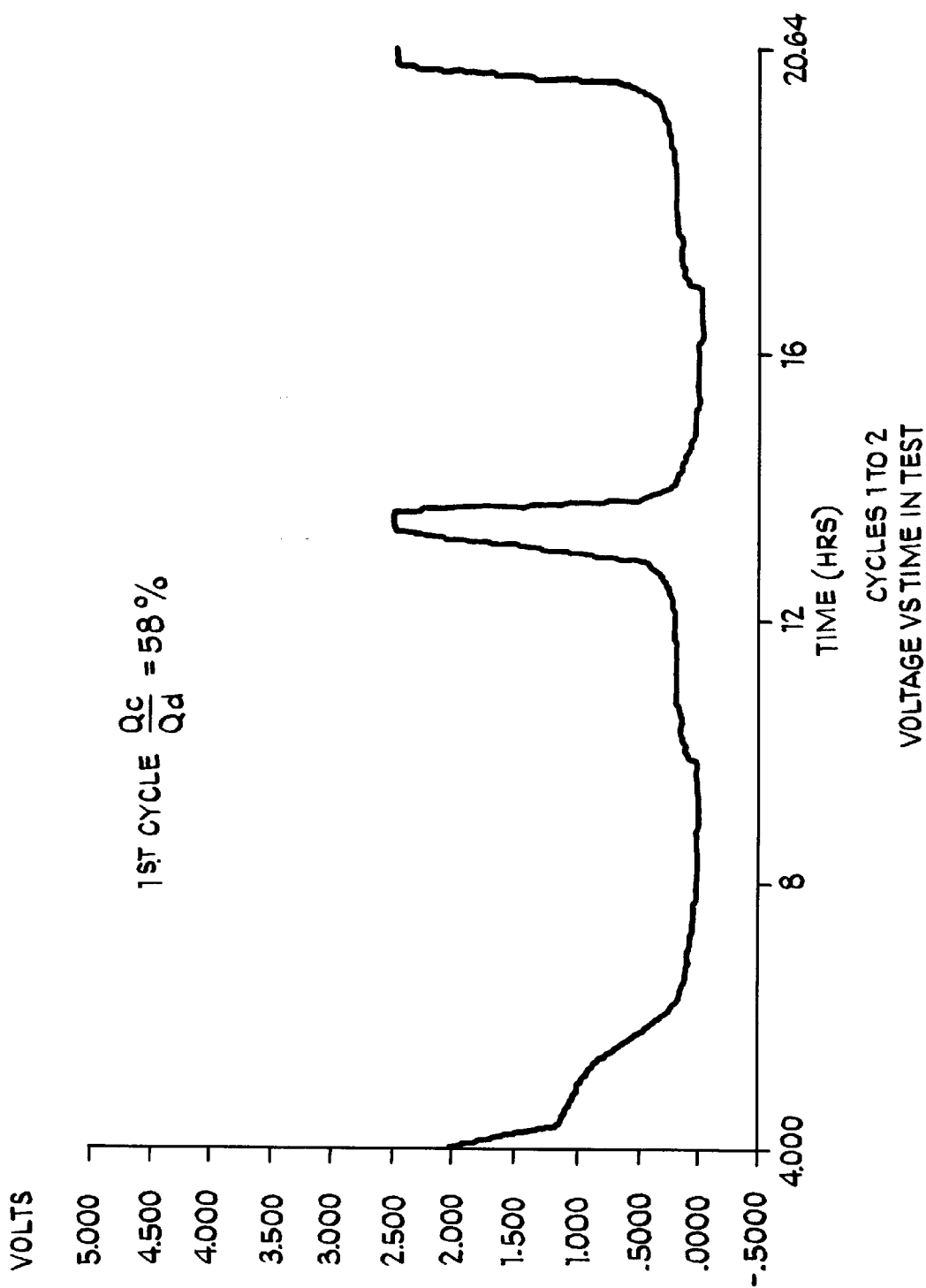

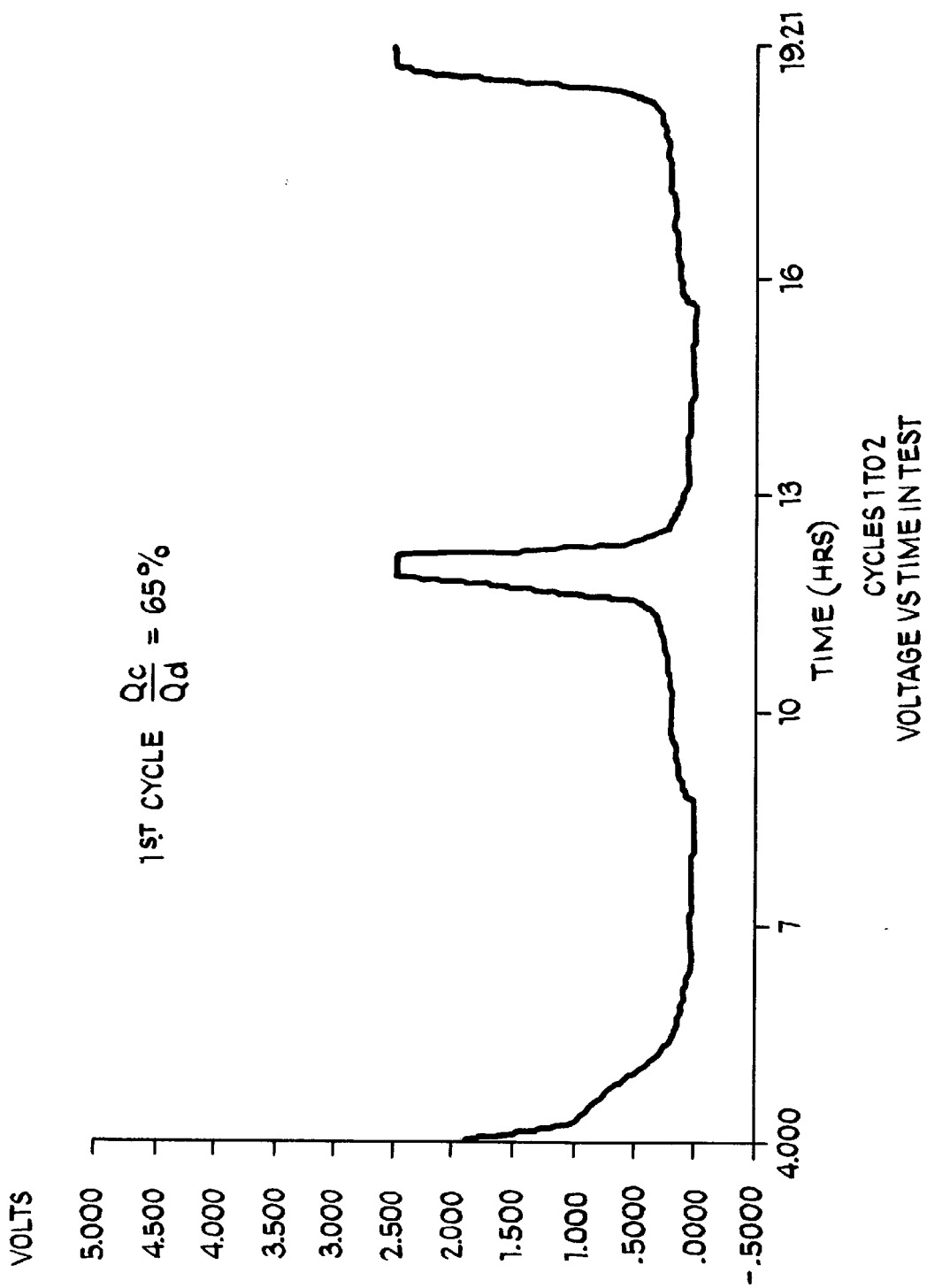

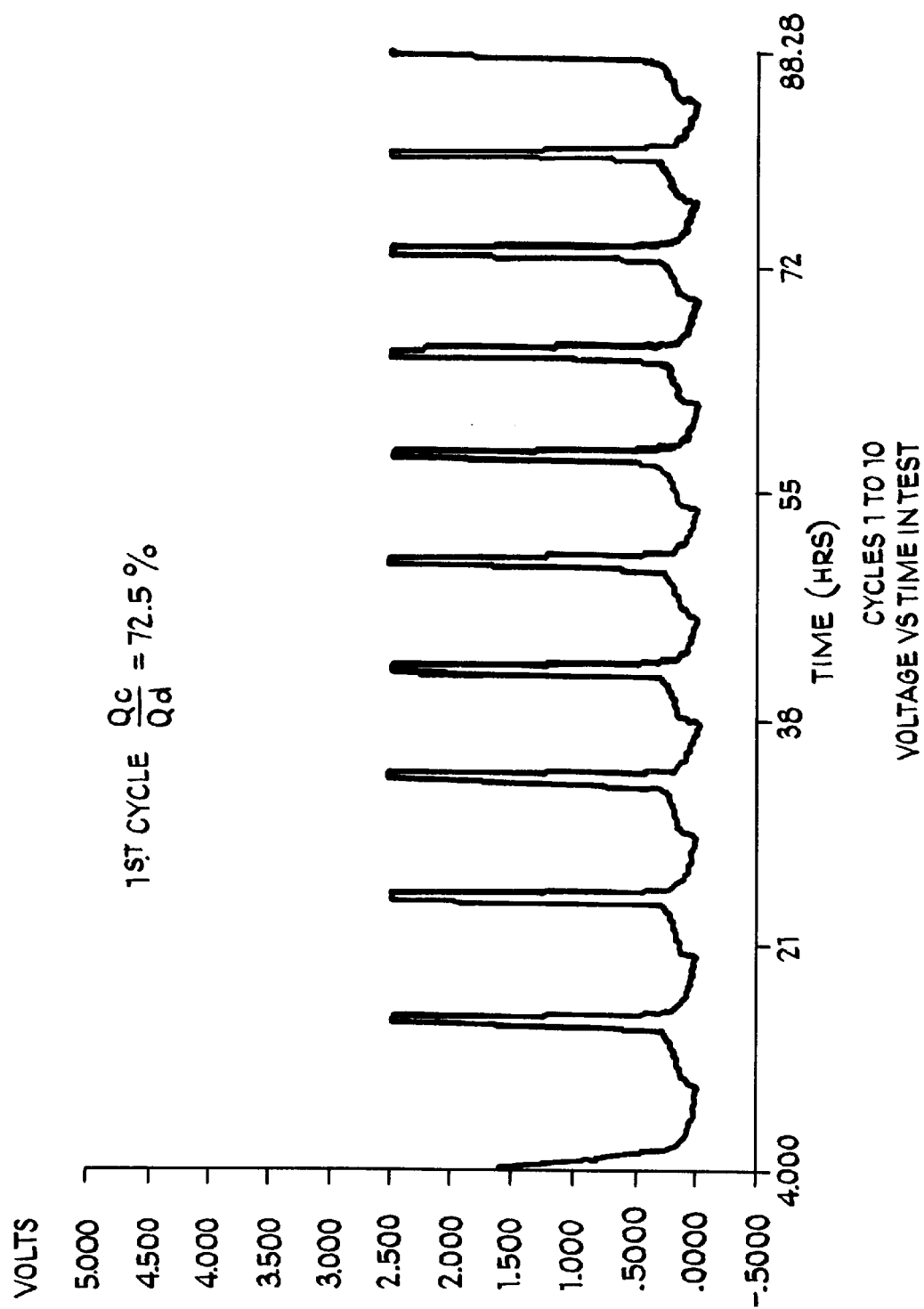

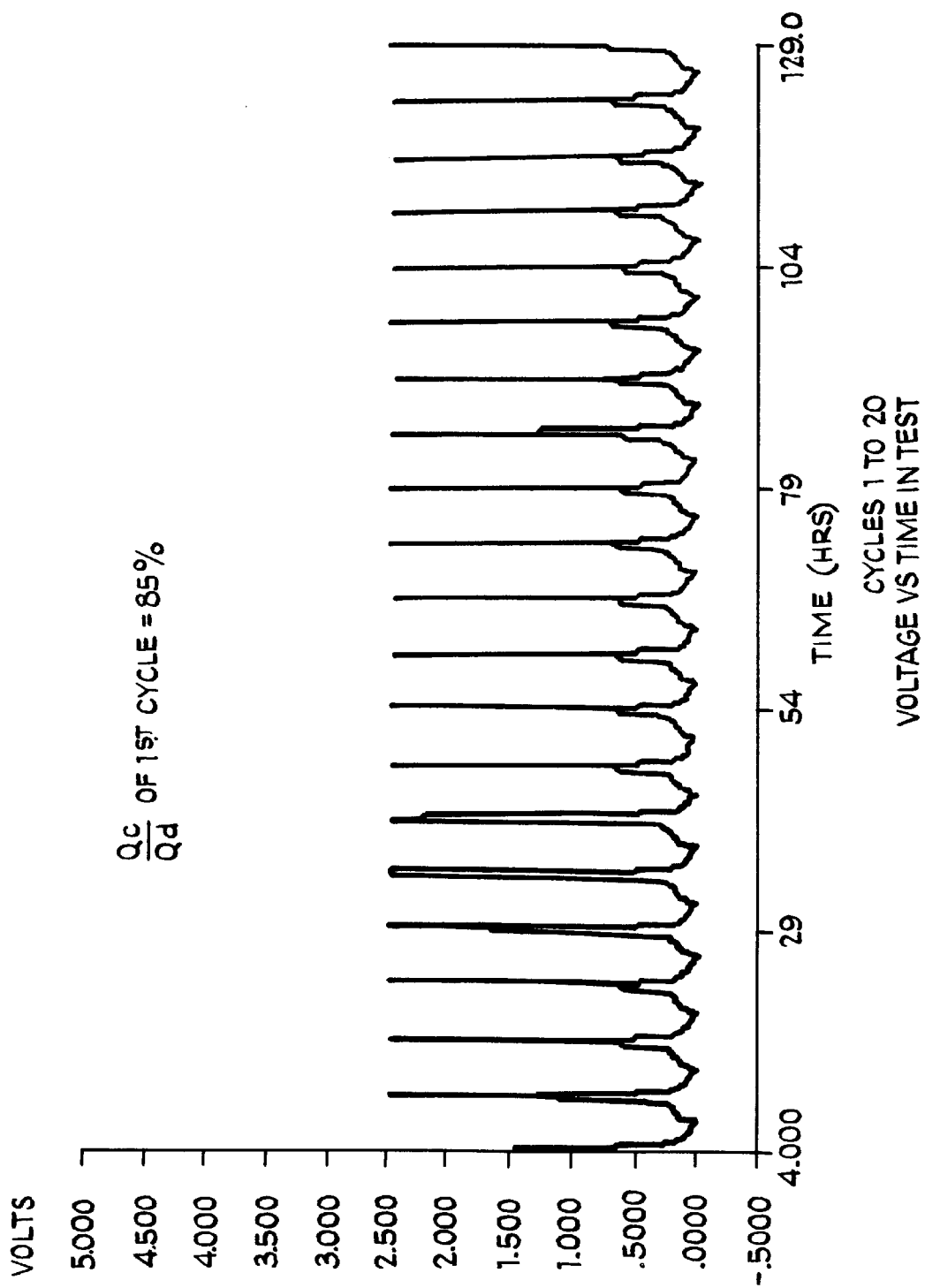

ELECTROLYTIC CELL HAVING A CONTROLLED ELECTRODE SURFACE INTERFACE

BACKGROUND OF THE INVENTION

1. Field of the Invention

The present invention relates in general to secondary electrolytic cells, and more particularly, to lithium ion electrolytic cells, and associated electrolytic processes, having an additive which precludes gas formation within the cell as a result of decomposition of solvents used in association with the electrolyte, and, wherein the additive itself does not form a gas during its decomposition during cell cycling and storage.

2. Background Art

Lithium ion electrolytic cells (such as lithium ion secondary batteries) have been known in the art for several years. Furthermore, lithium batteries using liquid, gel, polymer or plastic electrolytes which utilize carbon electrodes are likewise well known.

Although such electrolytes have been utilized, problems have been identified with respect to commercial solvents, utilized within the electrolyte, decomposing during cell cycling and storage. Indeed, as such solvents decompose, two adverse reactions occur. Specifically, upon initial charging of the cell, the solvent reacts with the electrode interface and forms a passivating layer thereat. As a result, the first cycle coulomic efficiency of the electrolytic cell is greatly diminished. Secondly, as the electrolytic cell is initially cycled and continues to be cycled, as well as stored, the solvent within the electrolyte continues to decompose—wherein such decomposition results in generation of gas, which creates a pressure buildup inside the cell. Accordingly, as the temperature of the cell increases, decomposition of the electrolyte, and in turn, increased gas formation will occur.

In an attempt to resolve the above-identified problems, the prior art has utilized an additive, typically added to the solvent/electrolyte, which reacts with the surface of the electrode prior to the solvent. As a result, the additive forms a passivating layer which precludes decomposition of the solvent.

While such prior art electrolytic cells have addressed concerns relative to decomposition of the solvent, they nevertheless have been unable to resolve the adverse offset associated with gas generation due to decomposition of the additive itself. Accordingly, while the use of additives have proven somewhat beneficial, gas generation, albeit from the additives as opposed to the solvent, still persists.

It is thus an object of the present invention to provide a lithium ion electrolytic cell which utilizes an additive which will form a stable passivating layer having excellent ionic transfer characteristics, wherein the passivating layer precludes decomposition of the solvent(s) within the electrolyte.

It is further an object of the present invention to provide a lithium ion electrolytic cell which utilizes an additive which will not result in the generation of gas during decomposition.

It is likewise an object of the present invention to provide a lithium ion electrolytic cell which demonstrates a high first cycle coulomic efficiency and which cell can be operated in low, as well as high temperature environments.

These and other objects of the present invention will become apparent in light of the present Specification, Claims and Drawings.

SUMMARY OF THE INVENTION

The present invention is directed to an electrolytic cell having a controlled electrode surface comprising a first electrode and a second electrode wherein at least one of the first and second electrodes includes a surface with carbon. An electrolyte is associated with at least a surface having the carbon, wherein the electrolyte includes at least one solvent. Passivating means are associated with the carbon surface for precluding the at least one solvent from contact and, in turn, chemical interaction with the carbon surface so as to preclude the otherwise generation of gas from decomposition of the solvent upon interaction with the carbon. The additive includes means for precluding gas formation within the electrolytic cell as a result of decomposition of the additive at the electrode with the carbon surface during cell cycling and storage.

In a preferred embodiment of the invention, the electrolytic cell further includes means for increasing first cycle coulomic efficiency of the electrolytic cell relative to an electrolytic cell without the additive. Such efficiency increasing means comprises the additive, but may also include the use of a primer material as well as a free radical quencher.

In another preferred embodiment of the invention, at least one of the electrolyte or the carbon surface layer of the first and second electrodes includes second means for precluding inadvertent gas formation, within the electrolytic cell. It is contemplated that such gas preclusion means comprises a free radical quench group.

The present invention is also directed to a process for manufacturing an electrolytic cell comprising the steps of: a) fabricating a first and second electrode where at least one of the electrodes includes a surface with carbon; b) associating at least one electrolyte, having at least one solvent, with the first and second electrodes; c) associating an additive with at least one of the electrolyte and the electrode with the surface with carbon; d) charging the electrolytic cell and, in turn, reacting the additive with the carbon surface so as to form a passivating layer thereat, wherein the passivating layer serves to, among other things, block the at least one solvent in the electrolyte from chemical interaction with the carbon surface, and wherein the additive comprises a chemical composition which will not form a gas within the electrolytic cell upon decomposition during cell cycling and storage.

In a preferred embodiment of the invention, the process further comprises the step of associating free radical quenchers with at least the electrolyte or the first and second electrode, wherein the free radical quenchers preclude the formation of any inadvertent gas formation within the electrolytic cell. The process also contemplates utilization of a primer material with the electrode with carbon.

A chemical process is also contemplated comprising the steps of: a) applying an electrical charge to the electrolytic cell; b) forming a passivating layer at the surface of the electrode with the carbon surface as a result of chemical interaction between the carbon and the additive; c) blocking penetration of the at least one solvent in the electrolyte through the passivating layer, and, in turn, into contact with the carbon, to, in turn, preclude formation of a gas which would otherwise occur as a result of decomposition of the at least one solvent in the electrolyte upon contact with the carbon; and d) decomposing the additive during cell cycling and storage without the formation of gas upon such decomposing.

The preferred process also includes the step of increasing first cycle coulomic efficiency relative to an electrolytic cell not utilizing the additive.

BRIEF DESCRIPTION OF THE DRAWINGS

FIG. 1 of the drawings is a schematic representation of the electrolytic cell of the present invention;

FIG. 2 of the drawings is a schematic representation of the electrolytic cell of the present invention;

FIG. 2a of the drawings is a schematic representation of the electrolytic cell of the present invention;

FIG. 3 is a flow chart of the chemical process of the present invention;

FIG. 4 is a graphic representation of first cycle coulomic efficiency of a prior art cell;

FIG. 5 is a graphic representation of first cycle coulomic efficiency of the present electrolytic cell;

FIG. 6 is a graphic representation of first cycle coulomic efficiency of the present electrolytic cell;

FIG. 7 is a graphic representation of first cycle coulomic efficiency of the present electrolytic cell; and FIG. 8 is a graphic representation of first cycle coulomic efficiency of the present electrolytic cell.

DETAILED DESCRIPTION OF THE DRAWINGS

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments illustrated.

Electrolytic cell 10 is shown in FIG. 1, prior to application of an electrical charge, as comprising first electrode 12 (having a carbon surface 24), second electrode 14 and electrolyte 16. Electrolyte 16 includes solvent 18 or mixtures thereof, free radical 20 and gas preclusion means (additive) 22. Although additive 22 is shown as being initially associated with the electrolyte, it is also contemplated that the additive initially be associated with either or both of first and second electrodes 12, 14, respectively.

Furthermore, although additive 22 will be exemplified in the experiments discussed in detail below as comprising two specific ring opening spiro-ketones, other compounds comprising similar functional groups, including ring opening spiro or cyclo organic compounds, among others, which, 1) will react with the carbon prior to any solvents in the electrolyte; 2) form a passivating layer on the carbon surface; 3) which then blocks any solvents in the electrolyte from contact with the carbon surface; and 4) which will not form a gas within electrolyte cell 10 upon decomposition during cell cycling and storage, are also contemplated. Likewise free radical quencher 20 will be described, for purposes of the present disclosure, as at least initially being associated with electrolyte 16. However, it is also contemplated that the free radicals be associated with one or both of first and second electrodes 12, 14, respectively. Moreover, although the free radical quencher exemplified in the experiments discussed in detail below are identified as the commercially available chemical compound Anthrone, it will be readily understood to those having ordinary skill in the art that compounds capable of free radical inhibition prior to any inadvertently formed or remaining gas within cell 10, are likewise contemplated for use. Of course, such free radical quencher would also need to be chemically inert with respect to the remainder of the cell.

Also, for purposes of the present disclosure, solvent 18 will be identified as comprising an organic carbonate solvent, such as PC (propylene carbonate), DEC (deithyl carbonate), DMC (dimethyl carbonate), EC (ethylene carbonate), although other commercially available and conventionally used solvents or electrolytic systems (such as liquid, polymer, gel and plastic), as would be readily understood to those having ordinary skill in the art having the present disclosure before them, are likewise contemplated for use.

Electrolytic cell 10 is shown in FIG. 2, subsequent to an application of an initial electrical charge, as including passivating layer 40 on carbon surface 24 of first electrode 12. As will be explained in greater detail, the passivating layer results from the affinity to and reaction of additive 22 (FIG. 1) with carbon surface 24. As previously explained, such a passivating layer will block solvent 18 from contact with carbon surface 24—so as to substantially preclude the generation of gas which would otherwise result from decomposition of the solvent. Indeed, such blocking enables a substantially greater freedom of solvent selection within electrolytic cell 10, and, in turn, use of solvents capable of withstanding relatively high and low operation temperature. Such variances in operating temperatures is further enhanced inasmuch as additive 22 (and, in turn, passivating layer 40) does not exhibit gaseous formation upon decomposition resulting during cell cycling and storage.

An alternative electrolytic cell 30 is shown in FIG. 2a as including a primer material 50 associated with first electrode 12. Inasmuch as this cell, other than the primer material, includes the same components as electrolytic cell 10 described in FIG. 1 and FIG. 2, like reference numerals will be used where applicable.

Specifically, primer material 50 is described as comprising lithium polysilicate. However, other conventional binders, as would be understood to those with ordinary skill in the art, are likewise contemplated. In addition to providing increased adhesion of the active electrode material to the particular current collector, it has been observed that such a primer, in combination with at least additive 27, and, in turn, passivating layer 40, substantially increases first cycle coulomic efficiency relative to cells not utilizing such components.

The process associated with the manufacture of electrolytic cell 10 (FIG. 1), as well as the actual chemical process which occurs within the cell upon initial electrical charging, is identified in FIG. 3, as including the following steps: First, the initial cell is manufactured by fabricating first electrode 12, second electrode 14 and electrolyte 16. For purposes of the present disclosure, first electrode 12 will comprise an anode having carbon surface layer 24, and second electrode 14 will comprise a cathode. Of course, in a secondary cell configuration, the anode and cathode will become interchangeable with each other, depending on whether the cell is charging or discharging. The particular electrolyte, as well as the electrodes, will be fabricated using conventional techniques. Additionally, solvent 18, free radical quencher 20 and additive 22, may be initially associated with the electrolyte. However, as explained, the free radical quenchers and additive may alternatively, or likewise, be associated with one or both of the electrodes.

After the cell has been fabricated, an initial electrical charge is applied. This charge will result in additive 22 (FIG. 1) reacting with carbon surface 24, so as to form passivating layer 40 (FIG. 2). The passivating layer blocks solvent 18 (FIG. 1) in electrolyte 16, from contact with the carbon surface layer. Accordingly, such blocking substantially precludes solvent decomposition, and, more particularly, gas formation within cell 10. Furthermore, although additive 22, and, in turn, passivating layer 40, will eventually decompose during cell cycling and storing, such decomposition will not result in gas formation. Indeed, to further aide in the preclusion of gas formation, free radical 20 (FIG. 2) will react with free radicals formed during solvent composition.

Inasmuch as solvent decomposition, which would otherwise occur upon contact with the carbon surface results in a substantial loss of first cycle coulomic efficiency, it has been found that the use of an additive (having the above described properties) results in an electrolytic cell having a substantially greater first cycle coulomic efficiency than when such an additive is not used—while further avoiding gas formation within the cell upon the additive decomposition. Likewise, and as previously discussed, it has also been found that use of such an additive, in combination with either or both of a free radical quencher and/or a primer (in accordance with the above-identified features), even further increases first cycle coulomic efficiency. Indeed, in support of such increased coulomic efficiency, several experiments were conducted. The results are summarized herein below.

Specifically, five experiments were conducted, wherein the following common testing procedures were used:

In all five experiments, an electrode (anode) having a carbon surface, was evaluated using a three-electrode cell. The electrode was cut in 2×2 $cm^2$ pieces, and functioned as the working electrode. Lithium metal was also cut into 2×2 $cm^2$ pieces, and served as the counter electrode. A lithium reference electrode was cut into 0.5×0.5 $cm^2$ pieces and was sandwiched between the working and counter electrodes. The electrodes were then separated by glass fiber paper and soaked in an electrolyte solution (to be described).

In experiments 2–5 an additive (having the previously described features) was associated with the electrolyte solution. The electrolyte additive preparation included dissolving 5.0 grams of either 1,6-dioxaspiro[4.4]noname-2-7dione (hereinafter 1,6 Spiro) or, 1,4-dioxasipiro[4.5]decane-2-one (hereinafter 1,4 Spiro) in 95.0 grams of propylene carbonate or propylene carbonate and ethylene carbonate mixture (1:1 by weight). Next, the solution was dried over 4A molecular sieves for three days to ensure that the moisture was less than 20 ppm, which was verified via conventional Karl-Fischer analysis. $LiAsF_6$ was dissolved in the solution until a concentration of 1M was obtained. The electrolyte solution was further dried using molecular sieves until the desired moisture of 20 ppm was obtained, which was likewise verified via conventional Karl-Fischer analysis.

In experiments 1, 2 and 3, the graphite carbon electrode was prepared in the following manner. First 4.9 grams of graphite powder (commercially known as LONZA KS-6) was mixed with 5.0 grams of 2% (by weight) PVDF/NMP (polyvinal diflouride and n-methylpyrolidome) solution. The graphite mixture was ballmilled for approximately twelve hours, and a paste was formed. Next, the resulting paste was coated on primed copper foil. Solvent NMP was then removed under vacuum at 80° C. for approximately 12 hours.

In experiment 4, 0.005 grams of Anthrone (a free radical quench group) available from Aldrich Chemical Co., was dissolved in 25.0 grams of toluene. Next 5.0 grams of (LONZA KS-6) graphite powder was suspended in the solution. Finally, the mixture was balimilled for approximately twelve hours, and the toluene was removed via evaporation.

In experiment 5, the graphite electrode was coated with a lithium polysilicate binder, wherein the binder was applied using conventional techniques.

Experiment No. 1

In this experiment, the electrolyte was not treated with an additive, thus providing a reference for comparing first cycle coulomic efficiency against carbon/graphite electrodes used in association with an additive.

The electrolytic cell of Experiment No. 1 was cycled from at least 2.500–0.005 V and then back up to 2.500 V with a charge and discharge current of 2 mA, and the voltage was held at 2.5 volts for 20 minutes, and the cycle was repeated. The performance of the electrolytic cell in Experiment No. 1 is graphically displayed in (FIG. 4), whereby the first cycle coulomic efficiency was empirically determined to be 36%—a relatively low coulomic efficiency.

Experiment No. 2

In this experiment, the electrolyte was treated with a 1,4 Spiro additive, and the solvent provided within the cell was PC/EC (1:1 by weight). The electrolytic cell of Experiment No. 2 was cycled between 2.500–0.005 V and then back up to 2.500 V with a charge and discharge current of 2 mA, and the voltage was held at 2.500 volts for 20 minutes, and the cycle was repeated. The performance of the electrolytic cell in Experiment No. 2 is graphically displayed in FIG. 5, whereby the first cycle coulomic efficiency was empirically determined to be 58%. As can be observed, the use of the additive provided an enhancement of the first cycle coulomic efficiency of 22% over the cell in Experiment No. 1.

Experiment No. 3

In this experiment, the electrolyte was treated with a 1,6 Spiro additive, and the solvent provided within the cell was a homogenous solution of PC. The electrolytic cell of Experiment No. 3 was cycled between 2.500–0.005 V and then back up to 2.500 V with a charge and discharge current of 2 mA and the voltage was held at 2.500 volts for 20 minutes, and the cycle was repeated. The performance of the electrolytic cell in Experiment No. 3 is graphically displayed in FIG. 6, whereby the first cycle coulomic efficiency was empirically determined to be 65%. The electrolytic cell in Experiment No. 3 provided an enhancement of the first cycle coulomic efficiency of 29% over the cell in Experiment No. 1.

Experiment No. 4

In this experiment, the electrolyte was prepared in the same manner as Experiment No. 3, however, in addition to the additive, the working electrode was treated with commercially available Anthrone to quench any inadvertent gas formation via radical propagation. The electrolytic cell was cycled between 2.500–0.005 V and then back up to 2.500 V with a charge and discharge current of 2 mA and the voltage was held at 2.500 volts for 20 minutes, and the cycle was repeated. The performance of the electrolytic cell in Experiment No. 4, which included the additive 1,6 Spiro and Anthrone is graphically displayed in FIG. 7, whereby the first cycle coulomic efficiency was empirically determined to be 73%. The electrolytic cell in Experiment No. 4 provided an enhancement of the first cycle coulomic efficiency of 37% over the cell in Experiment No. 1.

Experiment No. 5

In this experiment, the electrolyte was prepared in the same manner as in Experiment No. 3, however, in addition to the additive, the working electrode was enhanced with a lithium polysilicate primer. The electrolytic cell was cycled between 2.500–0.005 V and then back up to 2.500 V with a charge and discharge current of 1 mA and the voltage was held at 2.500 volts for 20 minutes, and the cycle was repeated. The performance of the electrolytic cell in Experiment No. 5, which included the additive 1,6 Spiro and a lithium polysilicate binder is graphically displayed in FIG.

8, whereby the first cycle coulomic efficiency was empirically determined to be 85%. The electrolytic cell in Experiment No. 5 provided an enhancement of the first cycle coulomic efficiency of 49% over the cell in Experiment No. 1.

In summary, in Experiments 1–5, three propositions are labratorily verified. First, by associating an additive, such as 1,4 Spiro and 1,6 Spiro with the electrolytic cell, one can observe a substantial increase in first cycle coulomic efficiency resulting from the formation of an additive passivating layer associated with the carbon electrode. Second, by treating the electrolytic cell with Anthrone (a free radical quenching group) one can observe a further increase in first cycle coulomic efficiency which results from the quenching of any free radical formation during decomposition of the solvent. Third, by using a lithium polysilicate primer associated with the electrode, and the additive, one can observe a remarkable increase in first cycle coulomic efficiency over an electrolytic cell without a lithium polysilicate primer and the additive.

Finally, the experimental data collected in Experiment Nos. 1–5 has been summarized in the following table:

| EXPERIMENT NO. 1 | ELECTRODE | ELECTROLYTE | COULOMIC EFF. % |
|---|---|---|---|
| 1 | LONZA KS-6 GRAPHITE W/2% WT. PVDF BINDER | 1M LiAsF$_6$ in PC/EC (1:1 SOLUTION | 36 |
| 2 | LONZA KS-6 GRAPHITE W/2% WT. PVDF BINDER | 1M LIAsF$_6$ in 5% BY WT. 1,4 SPIRO- 95% PC/EC (1:1) SOLUTION | 58 |
| 3 | LONZA KS-6 GRAPHITE W/2% WT. PVDF BINDER | 1M LiAsF$_6$ in 5% BY WT. 1,6 SPIRO- 95% PC SOLUTION | 65 |
| 4 | Anthrone treated graphite | 1M LiAsF$_6$ in 5% BY WT. 1,6 SPIRO - 95% PC SOLUTION | 73 |
| 5 | Graphite w/lithium polysilicate primer | 1M LiAsF$_6$ in 5% BY WT. 1,6 SPIRO - 95% PC SOLUTION | 85 |

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An electrochemical cell having a controlled electrode surface comprising:

a first electrode and a second electrode wherein at least one of the first and second electrodes includes a surface with carbon;

an electrolyte associated with at least the surface of a respective electrode having the carbon, wherein the electrolyte includes at least one solvent;

passivating means associated with the carbon surface for precluding the at least one solvent from contact and, in turn, chemical interaction with the carbon surface so as preclude the otherwise generation of gas from decomposition of the solvent upon interaction with the carbon, an additive associated with at least one of the electrolyte or at least one of the first and second electrodes, wherein the additive includes means for precluding gas formation within the electrochemical cell as a result of decomposition of the additive at the electrode with the carbon surface during cell cycling and storage.

2. The electrochemical cell according to claim 1 further including means for increasing first cycle coulombic efficiency of the electrochemical cell relative to an electrochemical cell without the additive.

3. The electrochemical cell according to claim 2 wherein the efficiency increasing means comprises the additive.

4. The electrochemical cell according to claim 2 wherein the efficiency increasing means includes a free radical quencher and the additive.

5. The electrochemical cell according to claim 2 wherein the efficiency increasing means includes a primer material, and at least one of the additive and a free radical quencher.

6. The electrochemical cell according to claim 1, wherein the first electrode comprises an anode and the second electrode comprises a cathode.

7. The electrochemical cell according to claim 1, wherein at least one of the electrolyte and the carbon surface layer of the respective one of the first and second electrode includes second means for precluding inadvertent gas formation, within the electrochemical cell.

8. The electrochemical cell according to claim 7 wherein the second preclusion means comprises a free radical quench group.

9. A process for manufacturing an electrochemical cell comprising the steps of:

fabricating a first and a second electrode wherein at least one of the electrodes includes a surface with carbon;

associating at least one electrolyte, having at least one solvent, with the first and second electrodes;

associating an additive with at least one of the electrolyte and the electrode with the surface with carbon;

charging the electrochemical cell and, in turn, reacting the additive with the carbon surface so as to form a passivating layer thereat, wherein the passivating layer serves to, among other things, block the at least one solvent in the electrolyte from chemical interaction with the carbon surface, and wherein the additive comprises a chemical composition which will not form a gas within the electrochemical cell upon decomposition of the additive during cell cycling and storage.

10. The process according to claim 9, further comprising the step of associating free radical quenchers with at least one of the electrolyte and the first and second electrode, wherein the free radical quenchers will preclude the formation of any inadvertent gas formation within the electrochemical cell.

11. The process according to claim 9 further comprising the steps of associating a primer material with the electrode with carbon.

12. A chemical process within an electrochemical cell having an electrolyte including at least one solvent, a first electrode and a second electrode, wherein at least one of the first and second electrodes includes a surface with carbon, and an additive associated with at least one of the electrolyte and the electrode with the carbon surface, the chemical process comprising the steps of:

applying an electrical charge to the electrochemical cell;

forming a passivating layer at the surface of the electrode with the carbon surface as a result of chemical interaction between the carbon and the additive;

blocking penetration of the at least one solvent in the electrolyte through the passivating layer, and, in turn, into contact with the carbon, to, in turn, preclude formation of a gas which would otherwise occur as the result of decomposition of the at least one solvent in the electrolyte upon contact with the carbon; and decomposing the additive during cell cycling and storage without the formation of a gas upon such decomposing.

13. The process according to claim 12 further including the step of increasing first cycle coulombic efficiency relative to an electrochemical cell not utilizing the additive.

14. The process according to claim 12 wherein the step of increasing efficiency comprises associating the additive with at least one of a free radical quencher and a primer material, wherein the primer material is associated with the electrode having carbon.

15. The process according to claim 12, wherein the electrochemical cell includes free radical quenchers associated with at least one of the electrolyte and the first and second electrode, the process further including the step of:

precluding the formation of any inadvertent gas formation within the electrochemical cell as a result of the free radical quenchers.

* * * * *